Figure 1:
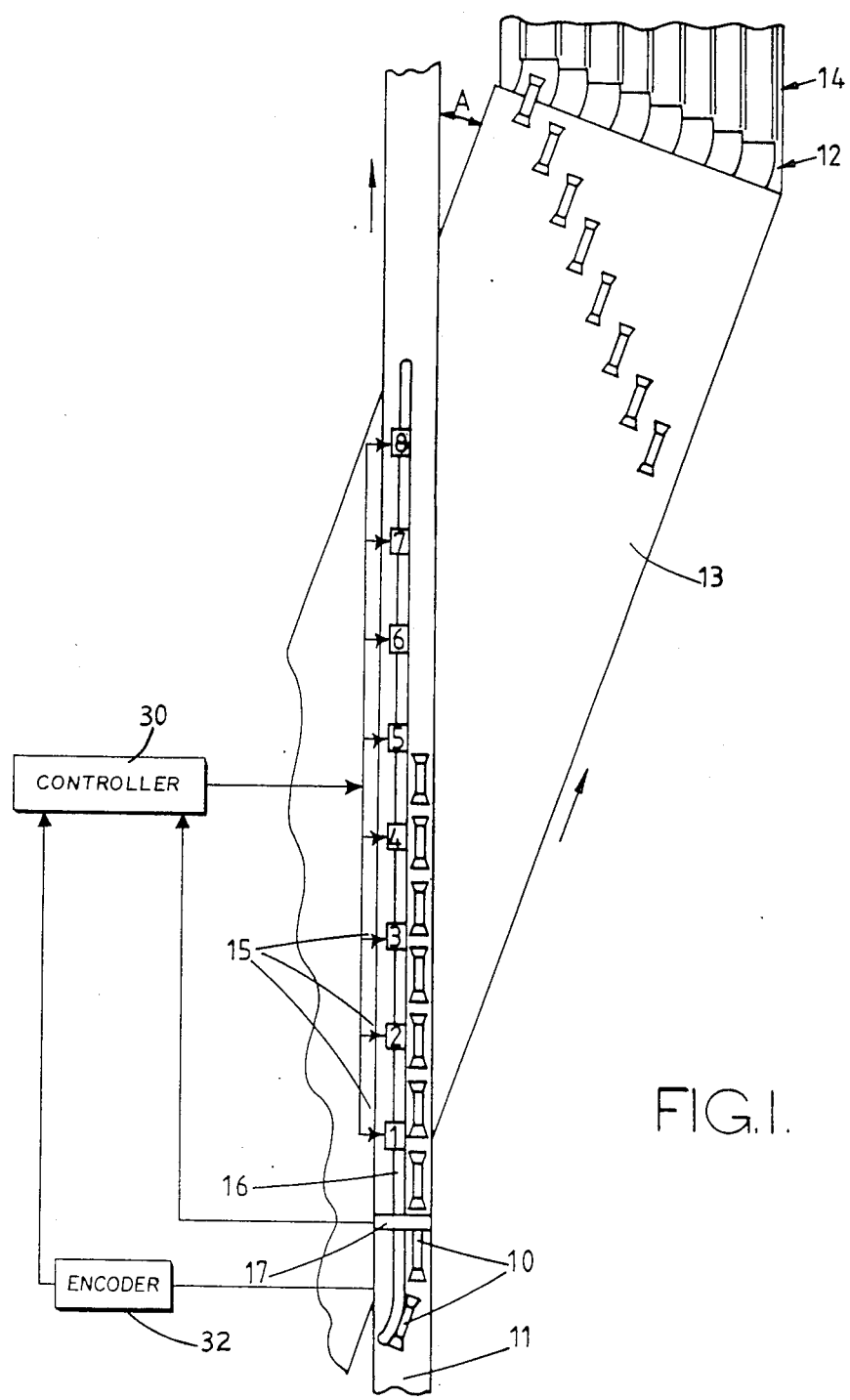

United States Patent [19]
Greeves

[11] Patent Number: 4,773,524
[45] Date of Patent: Sep. 27, 1988

[54] TRANSFER ARRANGEMENT

[75] Inventor: Thomas W. Greeves, Birmingham, England

[73] Assignee: Cambridge Consultants (Systems Engineering) Limited, Cambridge, England

[21] Appl. No.: 24,040

[22] Filed: Mar. 10, 1987

[30] Foreign Application Priority Data

Mar. 12, 1986 [GB] United Kingdom ............... 8606022

[51] Int. Cl.$^4$ ............................................. B65G 47/26
[52] U.S. Cl. .................................. 198/428; 198/437; 198/438
[58] Field of Search ............... 198/380, 428, 431, 437, 198/438, 456, 457, 349, 366, 358, 448, 462; 414/68

[56] References Cited

U.S. PATENT DOCUMENTS

| 2,609,947 | 9/1952 | Couchman, Jr. et al. | 198/437 X |
| 2,851,146 | 9/1958 | Sherrill | 198/438 X |
| 3,018,873 | 1/1962 | Burt | 198/349 |
| 3,185,277 | 5/1965 | Agnew | 198/437 X |
| 4,069,908 | 1/1978 | Johnson et al. | 198/437 |
| 4,214,663 | 7/1980 | Schopp et al. | 198/456 X |

FOREIGN PATENT DOCUMENTS

| 569840 | 7/1958 | Belgium | 198/380 |
| 716569 | 10/1954 | United Kingdom . | |

Primary Examiner—Frank E. Werner
Assistant Examiner—Cheryl L. Gastineau
Attorney, Agent, or Firm—Nixon & Vanderhye

[57] ABSTRACT

A transfer arrangement for transferring articles on one conveyor belt to another conveyor belt comprises a plurality of transfer units disposed alongside the one conveyor belt in spaced relationship. Each transfer unit includes an air nozzle controlled by a solenoid valve arranged when operated to direct a jet or jets of air at an article on the one conveyor belt to cause displacement of the articles onto the other belt.

8 Claims, 2 Drawing Sheets

TRANSFER ARRANGEMENT

This invention relates to a transfer arrangement for transferring articles moving in a single line on one conveyor belt to another conveyor belt or belts so that the articles move in a plurality of lines.

For the above purpose it has been proposed to utilize a binary division arrangement in which a first hinged deflector plate divides the single line into two lines which are then subdivided by a further two deflector plates respectively and so on until the required number of lines is obtained. The problem with this arrangement is that the first deflector plate has to work twice as quickly as the further two plates and as a result there is a limit to the rate at which articles can be supplied by the transfer arrangement since after deflection of one article in one direction the plate must then be moved to deflect the next article in another direction before the arrival of the next article. The articles must therefore be spaced to allow for movement of the plate. In addition in the event of malfunction of one of the deflector plates and its associated drive mechanism there is liable to be a build up of articles requiring rapid action to prevent damage to the articles, such action possibly requiring the stopping of the machine producing the articles.

It is known to displace articles by means of a jet of compressed air. In fact it is quite common when transporting articles on a conveyor to remove a defective article from the conveyor by means of an air blast. The air blast is obtained from a suitably positioned nozzle the flow of air through which may be controlled by a solenoid valve in turn controlled by some sensing arrangement upstream of the nozzle. Since it is hoped that the number of defective articles moving on the conveyor will be low little attention has been paid to the design of the nozzle and the amount of air flowing therethrough with the result that the defective article has been blown off the conveyor in a largely uncontrolled manner into a scrap bin or the like.

It has now been realised that by careful control of the jet and its duration an article may be displaced from the conveyor in a controlled manner and the object of the present invention is to provide a transfer arrangement of the kind specified in a simple and convenient form.

According to the invention a transfer arrangement of the kind specified comprises a plurality of transfer units equal in number to the desired number of lines of articles, said transfer units being disposed in spaced side by side relationship alongside the first conveyor belt, each transfer unit comprising means for directing a controlled jet of air at an article on the first conveyor belt to cause displacement of the article so that it is deposited on said another conveyor belt, an article sensing means disposed upstream of said transfer units for sensing the passage of articles on the first conveyor belt and control means responsive to signals provided by said sensing means for activating said transfer units.

Figure 2:
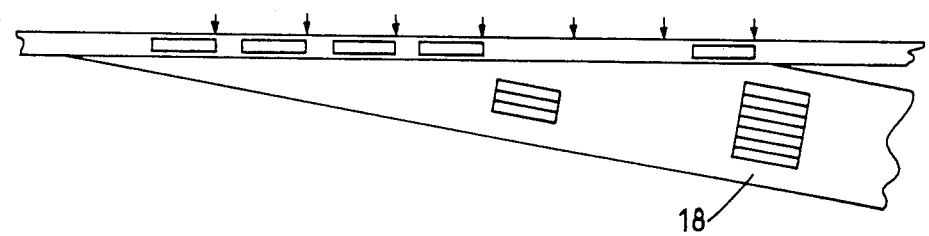
Figure 3:
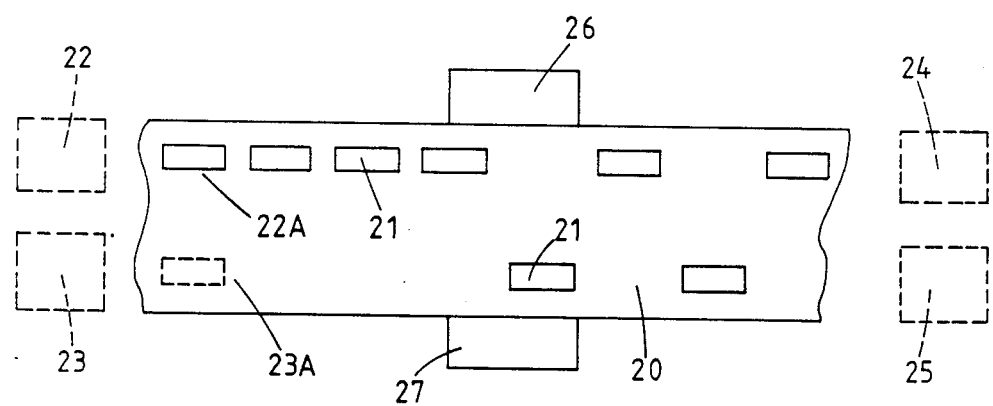
Figure 4:
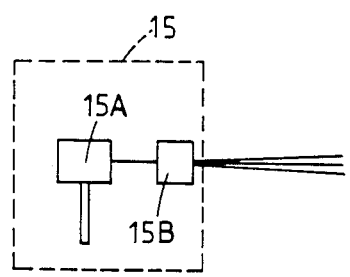

Examples of transfer arrangements will now be described with reference to the accompanying drawings in which:

FIG. 1 is a diagrammatic plan view of one example,
FIG. 2 is a view similar to FIG. 1 showing the formation of another article grouping,
FIG. 3 shows another form of arrangement, and
FIG. 4 shows in block form the construction of a part of the arrangments of FIGS. 1, 2 and 3.

The articles in the particular example are wrapped confectionery items such as chocolate bars. The wrapping machine delivers the articles 10 to a first conveyor belt 11 and it is required to feed the articles to the inlet chutes 12 of a packaging or cartoning machine whereby a number of the articles will be packed into boxes or some other container such as a transparent wrapper.

The articles are deposited in a line by the wrapping machine onto the first conveyor belt and this conveyor extends over a second conveyor belt 13 the direction of movement of which is at an angle A with that of the conveyor belt 11. In the example the angle A is approximately 20° although it is thought that the angle may be as much as 45°. The conveyor belt 13 is appreciably wider than the conveyor belt 11 so as to enable eight lines of articles to be produced, the lines of articles on the belt 13 being positioned so that the articles are fed into the respective chutes and then into the inlet guides 14 of the cartoning machine. Moreover, the linear speeds of the two conveyors are substantially equal.

The transfer of the articles from the conveyor belt 11 is achieved by controlled jets of air which are directed against the sides of the articles. The jets of air are provided by transfer units 15 which are mounted on a support 16 disposed just clear of the upper surface of the conveyor belt 11. The units 15 are mounted in spaced relationship in the direction of movement of the conveyor belt and have for convenience been numbered 1-8, the actual spacing depends upon the angle A and also the required spacing between the rows on the belt 13. Conveniently the support 16 carries or forms a guide which serves to position the articles adjacent the side edge of the conveyor belt 11.

Each transfer unit includes a solenoid operable valve 15A which controls the flow of air to one or more nozzles 15B which are disposed to direct a jet or jets of air, spaced in the direction of travel of the articles on the conveyor belt 11, onto the side of an article on the conveyor belt. The duration of the air jet is very short and is sufficient to provide a controlled lateral displacement of the articles from the conveyor belt 11 to the conveyor belt 13 at the same time imparting angular movement to the article so that it is correctly orientated on the belt 13. A single nozzle or a pair of closely spaced nozzles are used and the timing of operation of the valve is such that the jets of air strike the side of the article to produce a force which is sufficient to overcome the friction between the article and the belt and the inertia of the article and to impart to the article a lateral velocity component. The movement of articles onto the conveyor belt 13 can be assisted by means of a declining plate positioned alongside the conveyor belt 11. In this case the conveyor belt 11 is spaced above the conveyor belt 13.

The duration and strength of the jet or jets of air and the position at which they strike the article has a bearing upon the final position of the article on the conveyor belt 13. In the example described the articles are intended to be aligned in the direction of movement of the conveyor belt so as to be aligned with the chutes 12 and in such a case it is found that it is better to turn the leading end of the article first and then to urge the trailing end of the article clear of the conveyor belt 10.

It has also proved to be possible to displace articles from the conveyor 11 onto the conveyor 13 so that they form a single row on the conveyor 13 with the articles arranged transversely of the conveyor.

The nozzle or nozzles which produce the jets of air are designed to be as economical as possible in the consumption of air and in an example it was found that a 1.0 mm diameter nozzle would operate satisfactorily with pressures in the range 3.0–7.5 Bar. The construction of the nozzle should be such as to minimise the break up of the jet of air over its working distance that is to say the distance between the nozzle and the article. The nozzles may be constructed as a sharp edged orifice, as a convergent nozzle or as a convergent-divergent nozzle.

Upstream of the line of transfer units 15 is an article sensing means 17 which may comprise one or more photo electric sensors which are arranged to provide a signal each time an article 10 passes. The series of signals provided by the sensing means is supplied to control means 30 which controls the solenoid operated valves 15A of the transfer units 15 in sequence and in such manner that the articles on the conveyor belt 11 are displaced onto the conveyor belt 13 to form rows of articles thereon aligned with the chutes 12 respectively.

The aforesaid control means which conveniently is micro-processor based, in response to the signals provided by the sensing means and an encoder 32 which is responsive to the movement of the conveyor belt, is able to determine the position of each article in the transfer zone so that operation of the transfer units takes place to achieve the desired transfer of an article to the belt 13. The control means is therefore able to cope with unequal spacing of the articles on the conveyor belt 11 and varying belt speed. It can also be arranged to respond to signals from, for example, the cartoning machine indicative of a shortage of articles in one or more of the guides 14 or to an excess of articles. In the former case more articles can be directed to the particular guide or guides and in the latter case the articles can be allowed to remain on the conveyor belt 11 and be deposited in a suitable bin at the end of the conveyor belt. Moreover, the control means can be made responsive to signals provided by the wrapping machine indicative of faulty articles. In this case the faulty articles can be allowed to remain on the conveyor belt and be deposited in a bin.

In some applications it is required to assemble on the conveyor belt 13 what can be termed groups or stacks of articles as seen at 18 in FIG. 2. Each group or stack 18 comprises in the particular example, seven rows of articles with the articles being disposed in close side by side relationship. Such a group or stack of articles can be lifted by means of a hinged arm (not shown) having a suitable gripping arrangement and deposited directly into a carton. In order to form the articles into the groups or stacks 18 the conveyor belt 13 has to operate at about half the speed of the belt 10. This does require that the operation of the jets of air be very carefully controlled otherwise the articles may tend to skew so that the articles when on the conveyor belt 13 are not aligned in the direction of travel. On the other hand the trailing end portion of the article may tend to remain on the belt 10 thereby causing the article to slew in the opposite direction.

Another application for the use of jets of air to displace articles in a controlled manner on a conveyor belt is illustrated in FIG. 3. A single conveyor belt 20 receives articles 21 from one or both production machines 22, 23, the articles being placed on the conveyor in respective rows 22A, 23A. The conveyor belt 20 conveys the rows of articles to further machines 24, 25.

On opposite sides of the conveyor are located transfer units 26, 27 each including a nozzle or nozzles for directing a jet or jets of air across the conveyor belt. As shown in FIG. 3 the machine 23 is not in operation and therefore the articles produced by the machine 22 are divided between the machines 24, 25 by operation of the transfer unit 26 to displace alternate ones of the articles in the row 22A into the row 23A. In this manner the machines 24 and 25 are maintained in operation. In similar fashion if the machine 22 is out of action the machine 23 can be used to supply both machines 24 and 25 using the transfer unit 27. In the application above it is assumed that when all the machines are in use they are operated at half their speed or capacity. In the event therefore that one of the machines of a pair is stopped, the other machine of the pair can be speeded up so that the rate at which articles pass along the conveyor remains the same.

I claim:

1. A transfer arrangement for transferring articles supported in a single line on one conveyor belt to another conveyor belt or belts so that the articles move in a plurality of lines thereon, said another conveyor belt being disposed immediately below said one conveyor belt, and said one and another belts diverging in a direction of travel at an angle of up to 45°, the transfer arrangement comprising:
   a plurality of transfer units equal in number to the desired number of lines of articles,
   said transfer units being disposed in spaced side by side relationship alongside the one conveyor belt,
   each transfer unit comprising means for directing a controlled jet of air at an article on the one conveyor belt to cause a controlled lateral displacement of the article and a controlled angular movement of the article so that it is deposited on said another conveyor belt at a required position and orientation,
   an article sensing means disposed upstream of said transfer units for sensing the passage of articles on the one conveyor belt, and
   control means responsive to signals provided by said sensing means for activating said transfer units.

2. A transfer arrangement according to claim 1 in which each transfer unit includes a nozzle and a solenoid operated valve for controlling the air flow through the nozzle.

3. A transfer arrangement according to claim 2 in which the linear speeds of the conveyors are substantially equal.

4. A transfer arrangement according to claim 3 in which the divergence angle between the conveyors is 20°.

5. A transfer arrangement according to claim 1 or claim 2 in which said one conveyor belt has a linear speed which is substantially twice the speed of said another conveyor belt or belts, said transfer units being operative to displace articles so as to produce an aligned group of articles on said another conveyor belt.

6. A transfer arrangement according to claim 1 in which said control means is responsive to further signals to alter the rate at which articles are transferred to one or more of said plurality of lines.

7. A transfer arrangement according to claim 1 or claim 2 in which the linear speed of said another conveyor belt or belts is substantially half the linear speed of said one conveyor belt, said control means controlling the transfer unit so as to build up a group of articles on said another conveyor belt, each group of articles comprising a plurality of lines of articles with the articles being disposed in close side by side relationship.

8. Apparatus for transferring a plurality of articles, said apparatus comprising:

input conveyance means for supporting a plurality of articles in a line and for moving said articles in a first conveyance direction and at a first conveyance speed;

output conveyance means disposed immediately below said input conveyance means for supporting articles transferred from said input conveyance means at a predetermined location and angular orientation thereon, and for moving said transferred articles in a second conveyance direction, offset by an angle A relative to said first conveyance direction, and at a second conveyance speed;

plural transfer means corresponding in number to a number of articles to be transferred from said first conveyance means to said second conveyance means, said transfer means being laterally positioned relative to said number of articles to be transferred for directing a jet of air of a magnitude and duration sufficient to cause said number of articles supported upon said first conveyance means to be laterally displaced onto said second conveyance means so that said articles are then supported on said second conveyance means at said predetermined location and angular orientation thereon; and control means connected to said plural transfer means for controlling at least the duration of said air jet in dependance upon said first and second conveyance speeds and said angle A, to in turn cause said articles to be displaced from onto said second conveyance means and be supported thereupon at said predetermined location and said angular orientation.

* * * * *